(12) United States Patent
Xiao et al.

(10) Patent No.: US 7,405,176 B2
(45) Date of Patent: Jul. 29, 2008

(54) SOLID MAIN CATALYST COMPONENT FOR ETHYLENE POLYMERIZATION, A PROCESS FOR PREPARING THE SAME AND A CATALYST CONTAINING THE SAME

(75) Inventors: Mingwei Xiao, Shanghai (CN); Shijiong Yu, Shanghai (CN); Xiaofeng Ye, Shanghai (CN)

(73) Assignees: China Petroleum & Chemical Corporation, Beijing (CN); Shanghai Research Institute of Chemical Industry, Shanghai (CN)

( * ) Notice: Subject to any disclaimer, the term of this patent is extended or adjusted under 35 U.S.C. 154(b) by 229 days.

(21) Appl. No.: 10/833,889

(22) Filed: Apr. 28, 2004

(65) Prior Publication Data

US 2004/0248729 A1 Dec. 9, 2004

(30) Foreign Application Priority Data

Apr. 29, 2003 (CN) ................................ 03 1 16698

(51) Int. Cl.
*C08F 4/02* (2006.01)
*C08F 4/602* (2006.01)

(52) U.S. Cl. .................... 502/115; 526/124.5; 526/348; 502/120; 502/126

(58) Field of Classification Search ................. 502/103, 502/115, 120, 126; 526/124.5, 348
See application file for complete search history.

(56) References Cited

U.S. PATENT DOCUMENTS 4,302,565 A * 11/1981 Goeke et al. .................... 526/88
4,376,062 A * 3/1983 Hamer et al. .................... 502/9
6,140,264 A 10/2000 Kelly et al.
6,303,716 B1 10/2001 Xiao et al.

FOREIGN PATENT DOCUMENTS

| | | |
|---|---|---|
| CN | 1104220 A | 6/1995 |
| CN | 1223267 A | 7/1999 |
| CN | 1223268 A | 7/1999 |
| EP | 120503 A | 10/1984 |
| EP | 0 584 626 A2 | 3/1994 |
| EP | 0 771 820 A1 | 5/1997 |
| JP | 58132012 A | 8/1983 |

* cited by examiner

*Primary Examiner*—Caixia Lu
(74) *Attorney, Agent, or Firm*—Christensen O'Connor Johnson & Kindness PLLC

(57) ABSTRACT

The present invention provides a high-activity solid main catalyst component for ethylene polymerization, a process for preparing the same and a catalyst containing the same. The main catalyst component consists essentially of a magnesium compound, a titanium compound, an electron donor, an alkyl aluminum compound and fumed silica, and is prepared by a process comprising the step of: reacting powdered magnesium with an alkyl halide to form a magnesium compound in the nascent state; adding the magnesium compound in the nascent state together with a titanium compound and an alkyl aluminum compound into an electron donor to form a complex; adding and well dispersing a fumed silica thereto to form a homogeneous thick mixture; molding and drying the mixture to form main catalyst component particles with good particle morphology; and optionally, dispersing the main catalyst component particles into a hydrocarbon solvent or a mineral oil to form a slurry. The main catalyst component has high magnesium/titanium ratio, high titanium content, high polymerization activity, moderate initial activity so that polymerization can be stably performed, and there is little or no agglomerates during the preparation of the main catalyst component.

19 Claims, No Drawings

SOLID MAIN CATALYST COMPONENT FOR ETHYLENE POLYMERIZATION, A PROCESS FOR PREPARING THE SAME AND A CATALYST CONTAINING THE SAME

FIELD OF THE INVENTION

The present invention relates to a solid main catalyst component for ethylene polymerization, a process for preparing the same and a catalyst containing the same.

BACKGROUND OF THE INVENTION

Among the current polyethylene catalysts, what is mostly used is still Ziegler-Natta type catalysts. Since coming out in 1950s, Ziegler-Natta type catalyst has developed from 1st generation to 5th generation and has properties ceaselessly improved through researching and developing of various countries' scientists, so that polyethylene industry is propelled. However, with the appearance of new polyethylene processes such as condensed-state technique and super-condensed-state technique, activity of catalysts is required to be higher and higher. Thus at present, one important aspect of researching and developing on this type of catalysts is to enhance activity of a catalyst.

Increasing the atom ratio of magnesium element to transition metal element and increasing the amount of transition metal in catalysts are effective approaches for enhancing activity of catalysts, but there exist operation difficulties during the practice of preparing the catalysts, in particular, conventional impregnating-and-drying processes can hardly meet the requirement. U.S. Pat. No. 6,303,716 discloses a process for preparing a high activity solid catalyst by conventional impregnating-and-drying process, but during practical preparation, when ratio of Mg/Ti reaches above 3.0, catalyst agglomerates will occur. Although the catalyst agglomerates can be removed, yield of the catalyst will be reduced. When a catalyst containing catalyst agglomerates is used in gas phase polymerization, the formation of localized hot-spots in the fluidized bed will likely occur so that reaction temperature control will be more difficult, and catalysts are easily attached to the well of a reactor by static interaction so as to form polymer pieces which, after growing to a certain weight or length and then falling from the well in to the gas distributor of the fluidized bed, can affect operation stability of the fluidized bed.

EP 0771820 discloses a supported catalyst and improved conventional impregnating processes. First, an impregnating solution containing magnesium, titanium and an electron donor is formed, the impregnating solution is mixed with a carrier, and the solvent is evaporated, then the carrier is impregnated with the impregnating solution with same composition once more, and the solvent is evaporated. Impregnating may be repeated as many times as required. As a result, a high ratio of Mg/Ti is obtained, and the resulting catalyst has less agglomerates and high activity. However, the catalyst preparation procedure needs repeated impregnating (at least two times), and it is necessary to strictly control the concentration and volume of the impregnating solution depending on the pore volume of carrier, which renders the preparation procedure quite complicated. Moreover, amount of the electron donor used is greatly increased, therefore, the production cost is increased, and load of solvent recycling unit is also increased.

EP 0584626 discloses a catalyst prepared by reducing $TiCl_4$ using metal magnesium, adding a certain amount of $MgCl_2$ to enhance Mg/Ti ratio, impregnating the resultant solution onto silica and then drying or mixing the resultant solution with a filler and then spray-drying. When spray-drying is employed, Mg/Ti ratio can be controlled within a range of from 4:1 to 6:1, while when impregnating-and-drying process is employed, Mg/Ti ratio can be controlled within a range of from 2:1 to 5:1. The main catalyst component prepared by the process has a structure formula of $Mg_mTiCl_p[ED]_q$.

SUMMARY OF THE INVENTION

An object of the present invention is to provide a high-activity main catalyst component for ethylene polymerization. Said main catalyst component has high magnesium/titanium ratio and high titanium content, and therefore has high polymerization activity. In the meantime, said main catalyst component has moderate initial activity so that polymerization reaction can be stably performed. There is little or no agglomerating phenomenon during the preparation of the main catalyst component.

Another object of the present invention is to provide a process for preparing the main catalyst component.

Still another object of the present invention is to provide a high activity catalyst for ethylene polymerization consisting of the main catalyst component according to the present invention and a cocatalyst.

Still another object of the present invention is to provide an ethylene polymerization process, comprising contacting ethylene and optional α-olefin co-monomers with the catalyst according to the present invention under polymerization conditions.

DETAILED DESCRIPTION OF THE PREFERRED EMBODIMENT

In the first aspect, the present invention provides a high activity main catalyst component for ethylene polymerization, having a general formula:

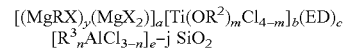

in which R is an alkyl group having from 3 to 12 carbon atoms, $R^2$ is an alkyl group having from 1 to 4 carbon atoms, $R^3$ is an alkyl group having from 1 to 14 carbon atoms, X is halogen, m is from 0 to 4, n is from 1 to 3, $SiO_2$ is fumed silica, y=0.02 to 1, a=1.96 to 6.0, b=1, e=0.5 to 5.0, j=2 to 60, preferably y=0.05 to 0.43, a=2.94 to 5.0, b=1, e=1.0 to 2.0, j=4 to 45, and y, a, b, e, and j is mole number of individual components, ED is an electron donor, and c represents weight percentage of residual electron donor in the main catalyst component, and is in the range from 15 to 35 percent by weight, preferably from 17 to 30 percent by weight, based on the total weight of the main catalyst component.

The main catalyst component is prepared by molding and drying a homogeneous thick material consisting essentially of a magnesium compound, a titanium compound, an electron donor, an alkyl aluminum compound and fumed silica.

The magnesium compound is a magnesium compound in the nascent state prepared by reacting powdered magnesium with an alkyl halide of formula RX, having a rational formula of $(RMgX)_y(MgX_2)$, in which y is in the range from 0.02 to 1, preferably from 0.05 to 0.43, R is an alkyl group having from 3 to 12 carbon atoms, and X is halogen, preferably chlorine.

The titanium compound can be represented by a formula $Ti(OR^2)_mCl_{4-m}$, in which $R^2$ is an alkyl group having from 1 to 4 carbon atoms and m is from 0 to 4. Examples of titanium compound include, but are not limited to, titanium tetrachloride, tetrabutyl titanate, methoxy titanium trichloride, butoxy titanium trichloride and mixture thereof, with titanium tetrachloride being preferred.

The alkyl aluminum compound can be represented by a formula $R^3{}_n AlCl_{3-n}$, in which $R^3$ is an alkyl group having from 1 to 14 carbon atoms and n is from 1 to 3. Examples of alkyl aluminum compound include, but are not limited to, triethyl aluminum, triisopropyl aluminum, triisobutyl aluminum, tri-n-hexyl aluminum, tri-n-octyl aluminum, tri(2-ethylhexyl) aluminum, diethyl aluminum chloride, ethyl aluminum dichloride, diisopropyl aluminum chloride, ethyl aluminum sesquichloride, butyl aluminum sesquichloride, with diethyl aluminum chloride being preferred.

The electron donor is an organic compound containing at least one atom selected from the group consisting of oxygen, sulfur, nitrogen, silicon, and phosphorus, and should be liquid state at atmospheric temperature and under atmospheric pressure. The electron donor can be aliphatic or aromatic ethers, esters, amines, alcohols, and the like, containing from 3 to 8 carbon atoms. Examples include diethyl ether, tetrahydrofuran, ethyl acetate, ethyl benzoate, tributyl phosphate, isobutanol, N,N-dimethylformamide, and the like, with tetrahydrofuran being preferred. The electron donor can be used alone or in combination.

The silica is a fumed silica, having an average particle size (collective state) of from 0.1 to 0.9 microns, and a specific surface area of from 100 to 500 $m^2/g$, preferably from 150 to 400 $m^2/g$. Examples are Cab-O-Sil® TS-610, EH5, M5, and the like available from Cabot Co.

In the second aspect, the present invention provides a process for the preparation of the main catalyst component. The main catalyst component according to the present invention can be prepared through a process comprising steps of:

(1) under nitrogen atmosphere, reacting powdered magnesium with an alkyl halide of formula RX in a hydrocarbon solvent to form a magnesium compound in the nascent state having a formula $(RMgX)_y(MgX_2)$, in which y=0.02 to 1, R is an alkyl group having from 3 to 12 carbon atoms, and X is halogen;

(2) forming a complex from the magnesium compound in the nascent state prepared in step (1), the titanium compound and the alkyl aluminum compound in the electron donor; then adding and well dispersing the fumed silica into the complex with stirring to form a homogeneous thick mixture;

(3) molding and drying the homogenous thick mixture obtained in step (2) to form main catalyst component having an average particle size of 10 to 50 microns; and (4) optionally, dispersing the main catalyst component obtained in step (3) into a hydrocarbon solvent or a mineral oil to form a slurry.

More specifically, the main catalyst component according to the present invention can be prepared through a process comprising steps of:

(1) under nitrogen atmosphere, reacting powdered magnesium with an alkyl halide in a hydrocarbon solvent at a temperature from 10 to 100° C. for 0.5 to 10 hours, to form a magnesium compound in the nascent state having a formula $(RMgX)_y(MgX_2)$, in which y=0.02 to 1, said alkyl halide having a formula of RX, in which R is an alkyl group having from 3 to 12 carbon atoms, and X is halogen, wherein the molar ratio of the powdered magnesium to the alkyl halide is in a range of from 1:1 to 1:3;

(2) adding the magnesium compound in the nascent state prepared in step (1) together with a titanium compound and an alkyl aluminum compound into an electron donor, and allowing the mixture to react with stirring at a temperature of from 20 to 80° C. for 0.5 to 10 hours to form a complex; then adding and well dispersing a fumed silica into the complex with stirring to form a homogeneous thick mixture, wherein the individual compounds are used in such amounts that molar ratio of alkyl aluminum compound: titanium compound:magnesium compound in the nascent state=(0.5 to 5.0):1:(2.0 to 10.0), molar ratio of the fumed silica to magnesium compound in the nascent state is in a range of from 1:1 to 10:1, and the electron donor is used in an amount of from 10 to 20 ml of electron donor per gram of the fumed silica;

(3) molding and drying the homogenous thick mixture obtained from step (2) to form main catalyst component having an average particle size of 10 to 50 microns; and (4) optionally, dispersing the main catalyst component obtained from step (3) into a hydrocarbon solvent or a mineral oil to form a slurry.

Now each step of the process for preparing the main catalyst component according to the present invention will be described in more detail.

(1) The Preparation of Magnesium Compound in the Nascent State:

Under nitrogen atmosphere, powdered magnesium reacts with the alkyl halide of formula RX in a hydrocarbon solvent at a temperature from 10 to 100° C., preferably from 20 to 80° C., for 0.5 to 10 hours, preferably from 1 to 8 hours, to form a magnesium compound in the nascent state. The resultant magnesium compound in the nascent state can be washed using hydrocarbon solvent for several times, then optionally dried to give a solid ready for use. In the reaction, molar ratio of the powdered magnesium to the alkyl halide is in the range of from 1:1 to 1:3.

The magnesium compound in the nascent state contains an amount of alkyl magnesium halide (RMgX), and has a rational formula of $(RMgX)_y(MgX_2)$, in which y is in the range from 0.02 to 1, preferably from 0.05 to 0.43, R is an alkyl group having from 3 to 12 carbon atoms, and X is halogen, preferably chlorine.

The hydrocarbon solvent can be aliphatic hydrocarbon, alicyclic hydrocarbon, or aromatic hydrocarbon, such as n-pentane, isopentane, n-hexane, n-octane, cyclopentane, cyclohexane, benzene, 1,2-dichloroethane, and the like, or mixtures thereof, preferably aliphatic hydrocarbon compound containing from 5 to 10 carbon atoms.

The alkyl halide can be represented by a formula of RX, in which R is an alkyl group having from 3 to 12 carbon atoms, and X is halogen, preferably chlorine. Examples include, but are not limited to, chloro-n-propane, chloro-n-butane, chloro-isobutane, chloro-isopentane and the like.

(2) The Preparation of Titanium-Containing Main Catalyst Component:

The magnesium compound in the nascent state prepared in above step (1) is dissolved in the electron donor. Then to the solution are added the titanium compound and the alkyl aluminum compound, and the resulting mixture is allowed to react with stirring at a temperature from 20 to 80° C. for from 0.5 to 10 hours, preferably from 1 to 8 hours, to form a complex. The individual compounds are used in such amounts that molar ratio of alkyl aluminum compound:titanium compound:magnesium compound in the nascent state= (0.5 to 5.0):1:(2.0 to 10.0), preferably (1 to 2):1:(3 to 6), wherein mole number of magnesium compound in the nascent state is calculated based on magnesium element. The amount of electron donor depends on the amount of the fumed silica, and is in the range of from 10 to 20 ml of electron donor per gram of the fumed silica. After cooling the complex to atmospheric temperature, the fumed silica is added and well dispersed into the liquid system of the complex with stirring to form a homogeneous thick mixture. Then the mixture is heated to 30 to 65° C. and maintained at that temperature for 0.5 to 3.0 hours. The molar ratio of the fumed silica to magnesium compound in the nascent state is in the range of from 1:1 to 10:1, preferably from 1.5:1 to 9:1.

The fumed silica is one having very small particle size, large specific surface area, and high purity. It has an average particle size (collective state) of from 0.1 to 0.9 microns, a specific surface area of from 100 to 500 m$^2$/g, preferably from 150 to 400 m$^2$/g, and a purity larger than 99.8 (% $SiO_2$). Examples of the fumed silica are Cab-O-Sil® TS-610, EH5, M5 and the like available from Cabot Corporation.

Prior to use, the fumed silica can be treated to remove the moisture from its surface by, for example, vacuumizing at room temperature or heating. Alternatively, the fumed silica can be used directly.

Since the fumed silica is apparently miscible with active components comprising electron donor, titanium compound, etc., at certain ratio, the fumed silica can combine together with higher lever of catalyst active components. Such a combination differs from conventional impregnating process.

The fumed silica functions to control and enhance viscosity and thixotropy in the liquid system. The development of viscosity and thixotropy directly results from the formation of network of fumed silica. The degree of the network formation of the fumed silica depends on such factors as the liquid nature, amount of the liquid, temperature of the system, the concentration and grade of the fumed silica, and the like. During the formation of the network of the fumed silica, if the network is too compact, a gel is likely to form and thereby destroy the homogeneity of the system. The fluid characteristic of the mixture imposes some effect on the formation of main catalyst component particles with good morphology by following molding and drying.

The process according to the present invention preferably utilizes tetrahydrofuran (THF) as electron donor and also as solvent. THF is of a hydrogen bond system with moderate strength. In general, a gel will form when the concentration of fumed silica in this system reaches from 15 to 20 percent by weight, and a homogeneous state will be obtained when said concentration is less than said value. However, the concentration of fumed silica in this system should not be too low, because too low concentration will not allow the combination of active components of the catalyst with the fumed silica, and the more electron donor will require more energy and time during, for example, spray drying. Therefore, in the case where molar ratio of the fumed silica to the magnesium compound in the nascent state is in the range of from 1:1 to 10:1, preferably from 1.5:1 to 9:1, the present invention employs THF in an amount of from 10 to 20 ml THF per gram fumed silica.

(3) The Molding and Drying of the Main Catalyst Component:

The molding and drying of the main catalyst component can be carried out through well-known processes. For instance, the following three processes can be employed in the present invention:

Process 1: Precipitating Process:

In accordance with this process, after slightly cooling the homogenous thick mixture obtained in step (2), a hydrocarbon solvent is slowly added thereto at an amount of from 0.20 to 2.5, preferably from 0.35 to 2.0 times by volume with respect to the amount of the added electron donor. $C_5$ to $C_8$ paraffin hydrocarbons can be used as the hydrocarbon solvent, with isopentane or n-hexane being preferred. The temperature for precipitating is suitably in the range of from 10 to 40° C. As the solvent is added, solid particles begin to precipitate. It is believed that the fumed silica functions as not only carrier but also crystal seed component to facilitate the formation and precipitation of the main catalyst component. Upon completion of adding solvent, the mixture is allowed to react for 0.5 to 3.0 hours. The liquid materials are evaporated by heating so that the residual content of the electron donor in said main catalyst component is from 15 to 35 percent by weight, preferably from 17 to 30 percent by weight. The main catalyst component particles thusly prepared have an average particle size of from 5 to 60 microns.

Process 2: Spray Drying Process:

The molding and drying of the main catalyst component can be carried out in one step through this process. The units useful in this process are usually classified as gas flow type, pressure type, and rotation type according to the type of the atomizer. The present invention preferably employs a rotary atomizer. Since THF used as solvent and electron donor needs to be recycled, the present invention employs a closed cycle spray dryer using nitrogen as drying medium.

The homogenous thick mixture obtained in step (2) is introduced into the spray dryer with nitrogen passing through as drying medium, to prepare a main catalyst component having an average particle size of 10 to 50 microns. The volume flow rate of the nitrogen should be larger than that of the introduced mixture, and the temperature of the nitrogen should be controlled higher than the boiling point of the electron donor. The content range of the electron donor in the main catalyst component could be controlled by controlling the flow rate and temperature of nitrogen. The residual content of the electron donor in said main catalyst component is from 15 to 35 percent by weight, preferably from 17 to 30 percent by weight.

In the present invention, the drying gas of the spray dryer can have an inlet temperature of from 130 to 180° C., and an outlet temperature of from 60 to 85° C. When a rotary atomizer is employed, the size and morphology of the finally formed main catalyst component particles are controlled mainly by adjusting rotational speed of the rotary atomizer. The peripheral velocity of the rotary atomizer can be from 60 to 180 m/s, preferably from 90 to 150 m/s. When a gas flow type of atomizer is employed, the size and morphology of the main catalyst component particles are controlled mainly by adjusting ratio of gas flow rate to liquid flow rate. Said ratio can be in the range of from 100 to 300. The formed main catalyst component can have an average particle size of 10 to 50 microns, preferably from 15 to 30 microns.

Process 3: High Speed Stirring Process

To the homogeneous thick mixture obtained in step (2) are added an inert mineral oil and a minor amount of a surfactant which is a nonionic surfactant of polyol fatty acid ester type. The mixture is heated to a temperature of from 60 to 80° C. and emulsified under high speed stirring with the stirring speed being in the range of from 600 to 1200 rpm, while most of the electron donor is distilled off over 0.5 to 3.0 hours. Then the emulsion is transferred into a pre-cooled hydrocarbon where the main catalyst component is quickly condensed and solidified as particles. The main catalyst component particles are washed with a hydrocarbon several times, and then dried by heating so that residual content of the electron donor in said main catalyst component is in a range of from 15 to 35 percent by weight, preferably from 17 to 30 percent by weight. The main catalyst component particles thusly prepared have an average particle size of from 10 to 60 microns.

All of the above-described three processes can be used to prepare the main catalyst component according to the present invention, and specific examples will be given later.

The solid main catalyst component prepared according to the above processes can be used in polymerization directly or after forming slurry by dispersing in a hydrocarbon solvent or an inert mineral oil. It is preferred to disperse the solid main catalyst component in a hydrocarbon solvent or an inert mineral oil to form a slurry prior to using it in polymerization.

The hydrocarbon solvent can be paraffin hydrocarbon, such as isopentane, hexane, n-heptane, octane, nonane, decane, or a mixture thereof. Since the existence of a hydrocarbon solvent is not beneficial to resin used for packing of food, the main catalyst component is preferably suspended in an inert mineral oil to form a slurry, and weight percentage of the main catalyst component in the total slurry may be from 10 to 50%.

The main catalyst component prepared through the above preparation processes can be added, together with an activating agent separately added at a certain ratio, to the polymerizing medium and thus activated in situ, or is optionally pre-activated with an activating agent prior to introduction into polymerizing medium. The activating agent used is an alkyl aluminum compound, for example, but not limited to, diethyl aluminum chloride, triethyl aluminum, tri-n-hexyl aluminum, ethyl aluminum dichloride or a mixture thereof. The amount of the activating agent is controlled based on the amount of residual electron donor in the main catalyst component, and usually is in the range of from 60 to 70 percent by mole of the residual electron donor.

In the third aspect, the present invention provides a high-activity catalyst for ethylene polymerization formed by contacting the main catalyst component according to the present invention and a cocatalyst component, wherein molar ratio of the Ti in the main catalyst component to the Al in the cocatalyst component is in a range of from 1:30 to 1:300, preferably from 1:50 to 1:250.

The cocatalyst useful in the catalyst according to the present invention is well known in the art, and is organoaluminum compound, such as triethyl aluminum, diethyl aluminum chloride, tri-isobutyl aluminum, tri-n-hexyl aluminum or a mixture thereof, with triethyl aluminum being preferred.

In the fourth aspect, the present invention provides an ethylene polymerization process, comprising contacting ethylene and optional co-monomers with the catalyst according to the present invention under polymerization conditions.

The high-activity catalyst for ethylene polymerization according to the present invention can be used in suspension process or gas phase process of ethylene polymerization, with the gas phase process of ethylene polymerization being preferred.

The high-activity catalyst for ethylene polymerization according to the present invention can be used directly in gas phase process of ethylene polymerization. The polymerization temperature can be in a range of from 80 to 115° C., preferably from 90 to 100° C., and polymerization pressure can be in a range of from 1.0 to 2.0 MPa.

If it is desired to produce linear low density polyethylene, co-monomer(s) may be added to adjust density of the product. Typical co-monomers are aliphatic alpha-olefins having from 3 to 8 carbon atoms. Suitable alpha-olefins include propene, 1-butene, 1-pentene, 1-hexene, 4-methyl-1-pentene, 1-heptene, 1-octene, and mixtures thereof. The preferred alpha-olefins are 1-butene and 1-hexene. Polyethylene products having a density of from 0.915 to 0.958 g/cc can be prepared by adding co-monomer(s).

In order to adjust melt index of polymer, a chain-transfer agent may be added to the polymerization reactor. Suitable chain-transfer agent is hydrogen, or diethyl zinc added to the catalyst. When partial pressure of hydrogen introduced is varied in a range of from 10 to 50 percent, a polyethylene product having a melt index $MI_{2.16}$ of from 0 to 60 g/10 min can be prepared.

The high-activity catalysts for ethylene polymerization according to the present invention have the following advantages:

1. The catalysts according to the present invention can be prepared by a simple process with the operation being easy, and are completely suitable for production and application on an industrial scale.
2. The polyethylene catalysts exhibit high polymerization activity with the activity being up to from 10,000 to 15,000 grams polyethylene per gram catalyst (polymerization conditions: partial pressure of ethylene is in a range of from 0.5 to 0.6 MPa, and polymerization time is 2 hours).
3. The activity of the catalysts can be controlled by adjusting Mg/Ti ratio. When Mg/Ti ratio is in a range of from 3 to 6, the catalysts exhibit higher activity, little or no agglomerating phenomenon is observed during the drying of the catalysts, and thus the formation of localized hot-spots during polymerization can be prevented.
4. The catalysts exhibit moderate initial activity, and the polymerization reaction is stable and easy to control.

EMBODIMENTS OF THE INVENTION

The present invention will be explained more detailed with reference to the following examples, but the examples do not intend to limit the scope of the invention in any way.

In the examples of the specification, analysis of main components of the catalysts and tests of the main properties of polyethylene products are performed using the following methods:

content of $Mg^{2+}$ is determined by EDTA (disodium ethylenediamine tetraacetic acid) titration;

content of $Cl^-$ is determined by potentiometer titration;

content of Ti is analyzed by chromatography;

amount of residual THF (tetrahydrofuran) is determined by analyzing the extract obtained by extracting solid product with acetone using gas chromatography;

melt index (MI) is measured according to ASTM D1238, Condition E, at 190° C.;

density of polymer is measured according to ASTM 1050; and bulk density of polymer is measured according to ASTM D1895.

EXAMPLE 1

(1) Preparation of Magnesium Chloride in the Nascent State

Into a 500 ml 5-necked reaction vessel provided with a stirrer, a condenser, a dropping funnel and means for heating were charged 250 ml of hexane and 6.0426 g of powdered magnesium. At 60° C., 53 ml of n-butyl chloride was dropwise added to the reactor over 3.0 hours. Upon completion of the addition, the mixture was maintained at 60° C. for 4 hours and a black suspension of magnesium chloride solid in the nascent state was obtained. Hexane was distilled off at 70° C. After cooling, 200 ml of THF was added to the reactor, and a black solution was obtained by stirring. Mg content was found as 1.7668 mol/L, Cl content was found as 3.3322 mol/L, thus Cl/Mg was 1.89, and the magnesium chloride in the nascent state could be expressed by a rational formula of $(BuMgCl)_{0.12}(MgCl_2)$.

(2) Preparation of Main Catalyst Component

To a 5-necked reactor were charged 18 ml of the solution obtained in step (1), 61 ml of THF, 1 ml of TiCl$_4$ and 1.4 ml of AlEt$_2$Cl. The mixture was heated to 60° C. and maintained at that temperature for 3 hours. After cooling the mixture to room temperature, 5 g of heat-treated fumed silica (EH-5, available from Cabot Corporation) was added with stirring, and a homogeneous thick mixture was obtained by means of stirring. The mixture was heated to 55° C. and allowed to react for 0.5 hours.

(3) Spray Drying of the Main Catalyst Component

The above-prepared homogeneous thick mixture was spray dried using a closed cycle spray dryer of gas flow type operated at the following conditions: nitrogen gas was introduced into the spray dryer at an inlet temperature of 160° C., outlet gas temperature was 70° C., and ratio of gas flow rate to liquid flow rate was 150, to form solid main catalyst component particles having an average diameter of 25 μm. The solid particles were collected in 40 ml of mineral oil (HydroBrite® 550 colorless mineral oil) to form a slurry with a solid content of 25 wt. %.

The main catalyst component contained 2.23 wt. % Ti, 3.88 wt. % Mg, 20.1 wt. % Cl, and 20.0 wt. % THF, so as to have an empirical formula of

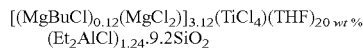
$[(MgBuCl)_{0.12}(MgCl_2)]_{3.12}(TiCl_4)(THF)_{20\,wt\%}$
$(Et_2AlCl)_{1.24} \cdot 9.2SiO_2$ (4) Polymerization Evaluation Prior to polymerization, 1.7 ml of diethyl aluminum chloride was added to the main catalyst component slurry, and the mixture was stirred at atmospheric temperature for 2 hours.

A slurry polymerization was performed in a 2L reactor. The polymerization conditions were as follows: 1 liter of hexane as diluent, 0.7 ml of triethyl aluminum, 0.1021 g of the above main catalyst component slurry (containing 0.0252 g of solid), total pressure: 0.8 MPa, partial pressure of nitrogen gas: 0.2 MPa, polymerization temperature: 80° C., polymerization time: 2 hours. 325 Grams of white polyethylene powders were obtained. The polymer product had a bulk density of 0.38 g/cm$^3$ and a density of 0.952 g/cm$^3$.

EXAMPLE 2

(1) Preparation of Magnesium Chloride in the Nascent State

The same procedure as described in Example 1 was followed.

(2) Preparation of Main Catalyst Component

The same procedure as described in Example 1 was followed, except that the individual reagents were used at the following amounts:

$(MgBuCl)_{0.12}(MgCl_2)$: 27 ml, THF: 53 ml, TiCl$_4$: 1.2 ml, AlEt$_2$Cl: 1.6 ml, SiO$_2$: 7.8 g.

(3) Spray Drying of the Main Catalyst Component

The same procedure as described in Example 1 was followed, and the obtained main catalyst component contained 2.03 wt. % Ti, 4.38 wt. % Mg, 20.3 wt. % Cl, and 23.2 wt. % THF, so as to have an empirical formula of

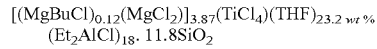
$[(MgBuCl)_{0.12}(MgCl_2)]_{3.87}(TiCl_4)(THF)_{23.2\,wt\%}$
$(Et_2AlCl)_{1.8} \cdot 11.8SiO_2$ (4) Polymerization Evaluation Prior to polymerization, 1.6 ml of diethyl aluminum chloride and 1.9 ml of tri-n-hexyl aluminum were added to the main catalyst component slurry, and the mixture was stirred at atmospheric temperature for 2 hours.

A slurry polymerization was performed in a 2L reactor. The polymerization conditions were the same as described in Example 1, except that polymerization total pressure was 0.8 MPa, wherein partial pressure of hydrogen gas was 0.1 MPa, and partial pressure of nitrogen gas was 0.1 MPa. The polymerization results were shown in Table 1.

EXAMPLE 3

(1) Preparation of Magnesium Chloride in the Nascent State

The same procedure as described in Example 1 was followed.

(2) Preparation of Main Catalyst Component

To a 5-necked reactor were charged 20 ml of the solution obtained in step (1), 50 ml of THF, 0.73 ml of TiCl$_4$ and 1.1 ml of AlEt$_2$Cl. The mixture was heated to 60° C. and maintained at that temperature for 3 hours. After cooling the mixture to room temperature, 4.7 g of heat-treated fumed silica (EH-5, available from Cabot Corporation) was added with stirring, and a homogeneous thick mixture was obtained by means of stirring. The mixture was heated to 60° C. and allowed to react for 1.5 hours. Upon completion of the reaction, the mixture was cooled to 25° C.

(3) Precipitating and Drying of the Main Catalyst Component

To the mixture obtained in above step (2) was slowly added 100 ml of n-hexane over 0.5 hours. Upon completion of the addition, the mixture was allowed to react for 1.0 hour. The solvent was evaporated with stirring, and the residual content of THF in the main catalyst component was controlled at 23.0 wt. %. The main catalyst component was suspended in 35 ml of mineral oil to form a slurry with a solid content of 25 wt. %.

The main catalyst component contained 2.41 wt. % Ti, 6.27 wt. % Mg, 27.9 wt. % Cl, and 23.0 wt. % THF, so as to have an empirical formula of

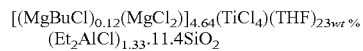
$[(MgBuCl)_{0.12}(MgCl_2)]_{4.64}(TiCl_4)(THF)_{23\,wt\%}$
$(Et_2AlCl)_{1.33} \cdot 11.4SiO_2$ (4) Polymerization Evaluation Prior to polymerization, 1.9 ml of diethyl aluminum chloride was added to the main catalyst component slurry, and the mixture was stirred at atmospheric temperature for 2 hours.

A slurry polymerization was performed in a 2L reactor. The polymerization conditions were the same as described in Example 1, except that polymerization total pressure was 0.8 MPa, wherein partial pressure of hydrogen gas was 0.15 MPa, and partial pressure of nitrogen gas was 0.15 MPa, and 150 ml of 1-hexene was added to the reactor. The polymerization results were shown in Table 1.

EXAMPLE 4

(1) Preparation of Magnesium Chloride in the Nascent State

The same procedure as described in Example 1 was followed.

(2) Preparation of Main Catalyst Component

The same procedure as described in Example 1 was followed, except that the individual reagents were used at the following amounts:
(MgBuCl)$_{0.12}$(MgCl$_2$): 12 ml, THF: 90 ml, TiCl$_4$: 0.5 ml, AlEt$_2$Cl: 0.5 ml, SiO$_2$: 4.5 g.

(3) Spray Drying of the Main Catalyst Component

The same procedure as described in Example 1 was followed, and the obtained main catalyst component contained 2.04 wt. % Ti, 4.64 wt. % Mg, 20.6 wt. % Cl, and 20.0 wt. % THF, so as to have an empirical formula of

[(MgBuCl)$_{0.12}$(MgCl$_2$)]$_{4.11}$(TiCl$_4$)(THF)$_{20\,wt\%}$ (Et$_2$AlCl)$_{0.88}$·16.3SiO$_2$ (4) Polymerization Evaluation Prior to polymerization, 1.5 ml of diethyl aluminum chloride was added to the main catalyst component slurry, and the mixture was stirred at atmospheric temperature for 2 hours.

A slurry polymerization was performed in a 2L reactor. The polymerization conditions were the same as described in Example 1, except that polymerization total pressure was 0.8 MPa, wherein partial pressure of hydrogen gas was 0.25 MPa, and partial pressure of nitrogen gas was 0.1 MPa, and 200 ml of 1-hexene was added to the reactor. The polymerization results were shown in Table 1.

EXAMPLE 5

(1) Preparation of Magnesium Chloride in the Nascent State

To a 500 ml 5-necked reactor was charged 250 ml of hexane and 5.3358 g of powdered magnesium. At 65° C., 46 ml of n-butyl chloride was dropwise added to the reactor over 3.0 hours. Upon completion of the addition, the mixture was maintained at 65° C. for 4 hours and a black suspension of magnesium chloride solid in the nascent state was obtained. Hexane was distilled off at 70° C. After cooling, 300 ml of THF was added to the reactor, and a black solution was obtained by stirring. Mg content was found as 0.8579 mol/L, Cl content was found as 1.5820 mol/L, thus Cl/Mg was 1.84, and the magnesium chloride in nascent state could be expressed by a rational formula of (BuMgCl)$_{0.19}$(MgCl$_2$).

(2) Preparation of Main Catalyst Component

To a 5-necked reactor were charged 35 ml of the solution obtained in step (1), 41 ml of THF, 0.8 ml of TiCl$_4$ and 0.9 ml of AlEt$_2$Cl. The mixture was heated to 63° C. and maintained at that temperature for 3 hours. After cooling the mixture to room temperature, 5.0 g of heat-treated fumed silica (TS-610, available from Cabot Corporation) was added with stirring, and a homogeneous thick mixture was obtained by means of stirring. The mixture was heated to 50° C. and allowed to react for 1.0 hour.

(3) Spray Drying of the Main Catalyst Component

The same procedure as described in Example 1 was followed, and the obtained main catalyst component contained 2.02 wt. % Ti, 4.09 wt. % Mg, 19.28 wt. % Cl, and 32.1 wt. % THF, so as to have an empirical formula of

[(MgBuCl)$_{0.19}$(MgCl$_2$)]$_{3.44}$(TiCl$_4$)(THF)$_{32.1\,wt\%}$ (Et$_2$AlCl)$_{1.0}$·11.4SiO$_2$ (4) Polymerization Evaluation Prior to polymerization, 1.8 ml of diethyl aluminum chloride was added to the main catalyst component slurry, and the mixture was stirred at atmospheric temperature for 2 hours.

A slurry polymerization was performed in a 2L reactor. The polymerization conditions were the same as described in Example 1, except that polymerization total pressure was 0.8 MPa, wherein partial pressure of hydrogen gas was 0.15 MPa, and partial pressure of nitrogen gas was 0.10 MPa, and 100 ml of 1-hexene was added to the reactor. The polymerization results were shown in Table 1.

EXAMPLE 6

(1) Preparation of Magnesium Chloride in the Nascent State

The same procedure as described in Example 5 was followed.

(2) Preparation of Main Catalyst Component

The same procedure as described in Example 5 was followed, except that the individual reagents were used at the following amounts:
(MgBuCl)$_{0.19}$(MgCl$_2$): 29 ml, THF: 50 ml, TiCl$_4$: 0.9 ml, AlEt$_2$Cl: 1.2 ml, SiO$_2$: 5.5 g.

(3) Molding of the Main Catalyst Component

To the homogeneous thick mixture obtained in above step (2) was added 50 ml of inert mineral oil (HydroBrite® 550, colorless mineral oil) and 0.6 g of sorbitan oleate. The mixture was heated to 75° C. and allowed to react under stirring with a stirring speed of 800 rpm for 2.5 hours, and then 45 ml of THF was distilled off to form an emulsion. While stirring, the emulsion was transferred into hexane which was pre-cooled to −10° C. The main catalyst component quickly condensed and solidified as particles to form a suspension. The main catalyst component was washed with hexane several times, and then the solvent was distilled off with stirring. Thus prepared, the main catalyst component was suspended in 32 ml of mineral oil to form a slurry with a solid content of 25 wt. %.

The obtained main catalyst component contained 2.14 wt. % Ti, 3.20 wt. % Mg, 16.82 wt. % Cl, and 20.5 wt. % THF, so as to have an empirical formula of

[(MgBuCl)$_{0.19}$(MgCl$_2$)]$_{2.55}$(TiCl$_4$)(THF)$_{20.5\,wt\%}$ (Et$_2$AlCl)$_{1.18}$·11.2SiO$_2$

(4) Polymerization Evaluation

Prior to polymerization, 1.2 ml of diethyl aluminum chloride was added to the main catalyst component slurry, and the mixture was stirred at atmospheric temperature for 2 hours.

A slurry polymerization was performed in a 2L reactor. The polymerization conditions were the same as described in Example 1, except that polymerization total pressure was 0.8 MPa, wherein partial pressure of hydrogen gas was 0.25 MPa, and partial pressure of nitrogen gas was 0.15 MPa, and 150 ml of 1-hexene was added to the reactor. The polymerization results were shown in Table 1.

EXAMPLE 7

(1) Preparation of Magnesium Chloride in the Nascent State

Into a 5 liter reaction vessel provided with a stirrer and control units of temperature and pressure were charged with 2.5 liters of hexane and 61.2 g of powdered magnesium. At 60° C., 536 ml of n-butyl chloride was added to the reactor over 3.0 hours. Upon completion of the addition, the mixture was allowed to react at 60° C. for further 4 hours. At the end of the reaction, hexane was distilled off at 80° C. After cooling the mixture to 30° C., 2.5 liters of THF was added to the reactor, and a black solution was obtained by stirring. Mg content was found to be 1.38 mol/L, Cl content was found to be 2.57 mol/L, thus Cl/Mg was 1.86, and the magnesium chloride in the nascent state could be expressed by a rational formula of $(BuMgCl)_{0.16}(MgCl_2)$.

(2) Preparation of Main Catalyst Component

The solution obtained in step (1) was filtered and then charged to another 5 liters reactor, then 84.5 ml of $TiCl_4$ and 114 ml of $AlEt_2Cl$ were added thereto. The mixture was heated to 60° C. and allowed to react at that temperature for 3 hours. After cooling the mixture to 40° C., 518 g of heat-treated fumed silica (TS-610, available from Cabot Corporation) was added thereto with stirring. The mixture was heated to 55° C. and allowed to react for 0.5 hours under more quickly stirring.

(3) Spray Drying of the Main Catalyst Component

The mixture obtained in step (2) was spray dried using a closed cycle rotating spray dryer operated at the following conditions: nitrogen gas was introduced into the spray dryer at an inlet temperature of 160° C. and at a flow rate of 30 kg/h, outlet gas temperature was 85° C., and peripheral velocity of the rotating atomizer was 150 m/s, to form solid main catalyst component particles having an average diameter of 25 μm. The solid particles were collected in 4.0 L of mineral oil (HydroBrite® 550, colorless mineral oil) to form a slurry with a solid content of 25 wt. %.

The main catalyst component contained 2.29 wt. % Ti, 4.88 wt. % Mg, 19.67 wt. % Cl, and 23.6 wt. % THF, so as to have an empirical formula of

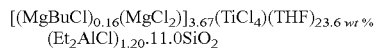

$[(MgBuCl)_{0.16}(MgCl_2)]_{3.67}(TiCl_4)(THF)_{23.6\ wt\ \%}$
$(Et_2AlCl)_{1.20} \cdot 11.0 SiO_2$

(4) Polymerization Evaluation

Prior to polymerization, 1.2 ml of diethyl aluminum chloride was added to 40 ml of the main catalyst component slurry, and the mixture was stirred at atmospheric temperature for 2 hours.

A slurry polymerization was performed in a 2L reactor. The polymerization conditions were the same as described in Example 1, and the polymerization results were shown in Table 1.

EXAMPLE 8

A solid main catalyst component was prepared according to the procedure as described in Example 1. Then 40 ml of hexane and 1.7 ml of diethyl aluminum chloride were added to the solid main catalyst component, and the resulting slurry was stirred at atmospheric temperature for 2 hours followed by distilling off hexane. Thus a pre-activated solid main catalyst component was obtained, and then used in gas phase polymerization.

Polymerization Evaluation

The polymerization reaction was carried out in a fluidized bed reactor having a diameter of 100 mm and a height of 1500 mm. First, 100 g of dried base of particulate polyethylene and 0.8 ml of triethyl aluminum as cocatalyst were charged into the fluidized bed reactor, and then an amount of the pre-activated solid main catalyst component was charged thereto. Other polymerization conditions were summarized in Table 2, and the experiments were numbered as 1, 2, 3, 4, 5 and 6. The polymerization reaction results were shown in Table 2.

EXAMPLE 9

Comparative Example

(1) Preparation of Magnesium Chloride in the Nascent State

The same procedure as described in Example 1 was followed.

(2) Preparation of Main Catalyst Component

The procedure was the same as described in Example 1, except that 17 g of Grace 955 grade silica was used to replace said fumed silica, and other reagents were used at the following amounts: $(MgBuCl)_{0.12}(MgCl_2)$: 16 ml, THF: 90 ml, $TiCl_4$: 1.0 ml, $AlEt_2Cl$: 1.4 ml, to form a gray solid slurry. The slurry was dried at 80° C., and residual content of THF in the main catalyst component was controlled as 10.5 wt. %. Solid powders with good flowability were obtained, but it was observed that there were flakes in the solid powders.

The main catalyst component contained 1.70 wt. % Ti, 2.52 wt. % Mg, 13.5 wt. % Cl, and 10.5 wt. % THF, so as to have an empirical formula of

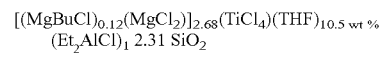

$[(MgBuCl)_{0.12}(MgCl_2)]_{2.68}(TiCl_4)(THF)_{10.5\ wt\ \%}$
$(Et_2AlCl)_1 \cdot 2.31\ SiO_2$ 100 ml of hexane and 3.5 ml of diethyl aluminum chloride were added to the main catalyst component, and the resulting mixture was stirred at atmospheric temperature for 2 hours followed by drying, to form a pre-activated main catalyst component.

(3) Polymerization Evaluation

The polymerization reaction was carried out in a fluidized bed reactor having a diameter of 100 mm and a height of 1500 mm. First, 100 g of dried base of particulate polyethylene and 0.8 ml of triethyl aluminum as cocatalyst were charged into the fluidized bed reactor, and then 0.0672 g of the main catalyst component prepared in above step (2) was charged thereto. The polymerization was performed at a total pressure of 1.0 MPa, with the composition of the feed gas being ethylene 40%, H₂ 30%, 1-butene 15%, and nitrogen gas 15%, and at a temperature of 90° C. for 3 hours. 230 grams of white polyethylene were obtained. It was found that the product had a melt index $MI_{2.16}$ of 6.2 g/10 min, and a density of 0.932 g/cm³.

TABLE 1

| | Polymerization Results | | | |
| --- | --- | --- | --- | --- |
| | Polymerization | Product Characteristics | | |
| Example No. | Activity gPE/gCat. | Melt Index g/10 min | Density g/cm³ | Bulk Density g/cm³ |
| 2 | 10800 | 2.7 | 0.951 | 0.321 |
| 3 | 11852 | 3.5 | 0.936 | 0.343 |
| 4 | 10010 | 10.9 | 0.928 | 0.367 |
| 5 | 11320 | 6.2 | 0.935 | 0.338 |
| 6 | 9784 | 13.7 | 0.932 | 0.354 |
| 7 | 11500 | 2.4 | 0.955 | 0.381 |

TABLE 2

| | Polymerization Conditions | | | | | | | Polymerization Results | | |
| --- | --- | --- | --- | --- | --- | --- | --- | --- | --- | --- |
| | | | | | | | | Polymerization | Product Characteristics | |
| Experiment | Pressure | Time | Temp. | *Composition of the feed gas % | | | | Activity | Density | $MI_{2.16}$ |
| No. | MPa | hour | ° C. | Hydrogen | Ethylene | 1-Butene | Nitrogen | gPE/gCat. | g/cm³ | g/10 min |
| 1 | 1.0 | 2 | 105 | 20 | 70 | — | 10 | 11009 | 0.958 | 8.8 |
| 2 | 1.0 | 2 | 95 | 25 | 60 | 15 | / | 11472 | 0.935 | 19.1 |
| 3 | 1.0 | 2 | 100 | 9 | 50 | 25 | 16 | 12143 | 0.922 | 5.1 |
| 4 | 1.0 | 2 | 100 | 40 | 40 | 20 | / | 10021 | 0.921 | 53.5 |
| 5 | 1.0 | 2 | 100 | 35 | 30 | 35 | / | 8116 | 0.910 | 61.4 |
| 6 | 1.0 | 2 | 100 | 10 | 80 | 10 | / | 15023 | 0.938 | 4.2 |
| Example 9 (Comparative Example) | 1.0 | 3 | 90 | 30 | 40 | 15 | 15 | 3423 | 0.932 | 6.2 |

While the preferred embodiment of the invention has been described, it will be appreciated that various changes can be made therein without departing from the spirit and scope of the invention.

The invention claimed is:

1. A main catalyst component for ethylene polymerization, having a general formula:

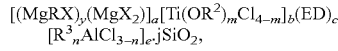

[(MgRX)_y(MgX_2)]_a[Ti(OR²)_mCl_{4-m}]_b(ED)_c
[R³_nAlCl_{3-n}]_e·jSiO_2, wherein the magnesium compound having a rational formula of $(RMgX)_y(MgX_2)$, as a component of the main catalyst component, is a magnesium compound in the nascent state prepared by reacting powdered magnesium with an alkyl halide of formula RX in a hydrocarbon solvent and wherein R is an alkyl group having from 3 to 12 carbon atoms, R² is an alkyl group having from 1 to 4 carbon atoms, R³ is an alkyl group having from 1 to 14 carbon atoms, X is halogen, m is from 0 to 4, n is from 1 to 3, SiO₂ is fumed silica, y=0.02 to 1, a=1.96 to 6.0, b=1, e=0.5 to 5.0, j=2 to 60, and y, a, b, e, and j is mole number of individual components, ED is electron donor, and c represents percentage by weight of residual electron donor in the main catalyst component, and is in the range of from 15 to 35 percent by weight, based on the total weight of the main catalyst component.

2. The main catalyst component according to claim 1, wherein X in the general formula is chlorine.

3. The main catalyst component according to claim 1, wherein in the general formula, y=0.05 to 0.43, a=2.94 to 5.0, b=1, e=1.0 to 2.0, j=4 to 45.

4. The main catalyst component according to claim 1, wherein the residual electron donor is present in the main catalyst component in an amount of from 17 to 30 percent by weight, based on the total weight of the main catalyst component.

5. The main catalyst component according to claim 1, wherein the fumed silica has an average particle size (collective state) of from 0.1 to 0.9 microns, and a specific surface area of from 100 to 500 m²/g.

6. The main catalyst component according to claim 1, wherein the electron donor is tetrahydrofuran.

7. A process for preparing a main catalyst component for ethylene polymerization, comprising the steps of:

(1) under nitrogen atmosphere, reacting powdered magnesium with an alkyl halide of formula RX in a hydrocarbon solvent to form a magnesium compound in the nascent state having a formula $(RMgX)_y(MgX_2)$, in which y=0.02 to 1, R is an alkyl group having from 3 to 12 carbon atoms, and X is halogen;

(2) forming a complex from the magnesium compound in the nascent state prepared in step (1), a titanium compound and an alkyl aluminum compound in an electron donor; then adding and well dispersing filmed silica into the complex with stirring to form a homogeneous thick mixture;

(3) molding and drying the homogenous thick mixture obtained in step (2) to form the main catalyst component having an average particle size of 10 to 50 microns; and (4) optionally, dispersing the main catalyst component obtained in step (3) into a hydrocarbon solvent or a mineral oil to form a slurry.

8. The process according to claim 7, wherein:

the titanium compound is represented by a formula Ti(OR²)_mCl_{4-m}, in which R² is an alkyl group having from 1 to 4 carbon atoms and m is from 0 to 4;

the alkyl aluminum compound is represented by a formula R³_nAlCl_{3-n}, in which R³ is an alkyl group having from 1 to 14 carbon atoms and n is from 1 to 3;

the electron donor is an organic compound containing, besides carbon and hydrogen atoms, at least one atom selected from the group consisting of oxygen, sulfur, nitrogen, silicon, and phosphorus, and can be aliphatic or aromatic ethers, esters, amines, alcohols, and the like, containing from 3 to 8 carbon atoms; and the fumed silica has an average particle size (collective state) of from 0.1 to 0.9 microns, and a specific surface area of from 100 to 500 $m^2/g$.

9. The process according to claim 7, wherein in step (2), the individual compounds are used in such amounts that molar ratio of alkyl aluminum compound: titanium compound:magnesium compound in the nascent state=(0.5 to 5.0):1:(2.0 to 10.0), molar ratio of the fumed silica to magnesium compound in the nascent state is in a range of from 1:1 to 10:1, and the electron donor is used in an amount of from 10 to 20 ml of electron donor per gram of the fumed silica.

10. The process according to claim 9, wherein in step (2), the individual compounds are used in such amounts that molar ratio of alkyl aluminum compound: titanium compound:magnesium compound in the nascent state=(1 to 2):1:(3 to 6).

11. A process for preparing the main catalyst component according to claim 1, comprising the steps of:

(1) under nitrogen atmosphere, reacting powdered magnesium with an alkyl halide in a hydrocarbon solvent at a temperature from 10° to 100° C. for 0.5 to 10 hours, to form a magnesium compound in the nascent state having a formula $(RMgX)_y(MgX_2)$, in which y=0.02 to 1, said alkyl halide having a formula of RX, in which R is an alkyl group having from 3 to 12 carbon atoms, and X is halogen, wherein the molar ratio of the powdered magnesium to the alkyl halide is in a range of from 1:1 to 1:3;

(2) adding the magnesium compound in the nascent state prepared in step (1) together with a titanium compound and an alkyl aluminum compound into an electron donor, and allowing the mixture to react with stirring at a temperature of from 20° to 80° C. for 0.5 to 10 hours to form a complex; then adding and well dispersing a fumed silica into the complex with stirring to form a homogeneous thick mixture, wherein the individual compounds are used in such amounts that the molar ratio of alkyl aluminum compound:titanium compound:magnesium compound in the nascent state=(0.5 to 5.0):1:(2.0 to 10.0), the molar ratio of the fumed silica to magnesium compound in the nascent state is in a range of from 1:1 to 10:1, and the electron donor is used in an amount of from 10 to 20 ml of electron donor per gram of the fumed silica;

(3) molding and drying the homogenous thick mixture obtained from step (2) to form the main catalyst component having an average particle size of 10 to 50 microns; and (4) optionally, dispersing the main catalyst component obtained from step (3) into a hydrocarbon solvent or a mineral oil to form a slurry.

12. The process according to claim 11, wherein in step (2), the individual compounds are used in such amounts that the molar ratio of alkyl aluminum compound: titanium compound:magnesium compound in the nascent state=(1 to 2):1:(3 to 6).

13. The process according to claim 11, wherein in step (3), a hydrocarbon solvent is added to the homogenous thick mixture obtained from step (2) to precipitate the main catalyst component, then solvent is partially evaporated to such extent that the residual content of the electron donor in the main catalyst component is from 15 to 35 percent by weight, to give the main catalyst component.

14. The process according to claim 11, wherein the hydrocarbon solvent is selected from the group consisting of isopentane, hexane, n-heptane, octane, nonane, decane and mixtures thereof.

15. The process according to claim 11, wherein step (3) is performed through a spray-drying process.

16. The process according to claim 11, wherein in step (3), the homogenous thick mixture obtained from step (2) is formed into an emulsion in an inert mineral oil, and then is added to a pre-cooled hydrocarbon to make the main catalyst component solidify as particles by quickly condensing.

17. The process according to claim 11, wherein:

the titanium compound is represented by a formula $Ti(OR^2)_mCl_{4-m}$, in which $R^2$ is an alkyl group having from 1 to 4 carbon atoms and m is from 0 to 4;

the alkyl aluminum compound is represented by a formula $R^3{}_nAlCl_{3-n}$, in which $R^3$ is an alkyl group having from 1 to 14 carbon atoms and n is from 1 to 3;

the electron donor is an organic compound containing, besides carbon and hydrogen atoms, at least one atom selected from the group consisting of oxygen, sulfur, nitrogen, silicon, and phosphorus, and can be aliphatic or aromatic ethers, esters, amines, alcohols, and the like, containing from 3 to 8 carbon atoms; and the fumed silica has an average particle size (collective state) of from 0.1 to 0.9 microns, and a specific surface area of from 100 to 500 $m^2/g$.

18. A high-activity catalyst for ethylene polymerization, comprising:

(a) the main catalyst component according to claim 1, and
(b) an organoaluminum cocatalyst component, wherein the molar ratio of Ti in the main catalyst component to Al in the cocatalyst component is in a range of from 1:30 to 1:300.

19. An ethylene polymerization process, comprising contacting ethylene and optional α-olefin comonomers with the catalyst according to claim 18 under polymerization conditions.

* * * * *

UNITED STATES PATENT AND TRADEMARK OFFICE
CERTIFICATE OF CORRECTION

PATENT NO. : 7,405,176 B2  Page 1 of 1
APPLICATION NO. : 10/833889
DATED : July 29, 2008
INVENTOR(S) : M. Xiao et al.

It is certified that error appears in the above-identified patent and that said Letters Patent is hereby corrected as shown below:

| COLUMN | LINE | |
|---|---|---|
| Title page, Item (30) Pg. 1, col. 1 | Foreign Application Priority Data | "03 1 16698" should read --03 1 16698.9-- |
| Col. 16 (Claim 7, | 51 line 51) | "filmed silica" should read --fumed silica-- |

Signed and Sealed this

Twenty-fourth Day of February, 2009

JOHN DOLL
*Acting Director of the United States Patent and Trademark Office*